Oct. 18, 1949.  M. LIWSCHITZ ET AL  2,484,840
ELECTRICAL MACHINE

Filed July 9, 1946  5 Sheets-Sheet 1

1st Stage

2nd Stage

3rd Stage

Fig.4.

WITNESSES:

INVENTORS
Albert W. Kimball and
Michael Liwschitz.
BY
Paul E. Friedemann
ATTORNEY Oct. 18, 1949.  M. LIWSCHITZ ET AL  2,484,840
ELECTRICAL MACHINE
Filed July 9, 1946  5 Sheets-Sheet 2

INVENTORS
Albert W. Kimball and
Michael Liwschitz.
BY
Paul E. Friedemann
ATTORNEY

Oct. 18, 1949.   M. LIWSCHITZ ET AL   2,484,840
ELECTRICAL MACHINE

Filed July 9, 1946   5 Sheets-Sheet 5

WITNESSES:

INVENTORS
Albert W. Kimball and
Michael Liwschitz.
BY
Paul E. Friedemann
ATTORNEY Patented Oct. 18, 1949

2,484,840

UNITED STATES PATENT OFFICE 2,484,840

ELECTRICAL MACHINE

Michael Liwschitz, Brooklyn, N. Y., and Albert W. Kimball, Pittsburgh, Pa., assignors to Westinghouse Electric Corporation, East Pittsburgh, Pa., a corporation of Pennsylvania Application July 9, 1946, Serial No. 682,188

15 Claims. (Cl. 322—92)

Our invention concerns rotary direct-current machines for generating, controlling or regulating purposes and is related to, and in some aspects an improvement upon, machines of the type disclosed in the copending application Serial No. 607,440, filed July 27, 1945, by W. R. Harding and A. W. Kimball, and assigned to the assignee of the present patent.

It is an object of the invention to achieve within a single-armature machine an amplifying performance of an extremely high amplification factor in conjunction with high speed of response, satisfactory accuracy and high stability of operation.

To this end, and in accordance with our invention, we provide a multipole direct-current generator with a multistage cascade-type amplification system of field exciting circuits in such a manner that a plurality of amplifier stages receive their respective excitation from separate internal circulating currents. Since the first stage of such a machine is excited by signal, control or input voltage originating from some external source of energy, the invention results in at least three cascade stages of amplification thus affording an overall amplification whose magnitude, if desired, can be increased to an order of magnitude higher than that obtainable in any single amplifying machine of the rotary type heretofore available. For instance, with an amplification factor of approximately 100 to 1 for each stage, a total amplification in the order of $100 \times 100 \times 100 = 1{,}000{,}000$ can be obtained by a three-stage amplifier according to this invention; and a still further increase in order of magnitude can be achieved when applying more than two stages of excitation by internal circulating currents in cascade sequence to the separately excited input stage.

These and other objects and advantages of the invention will be apparent from the following description in conjunction with the drawings in which:

Fig. 16 illustrates the stator frame and armature structure of an eight-pole machine, while

Figure 1:
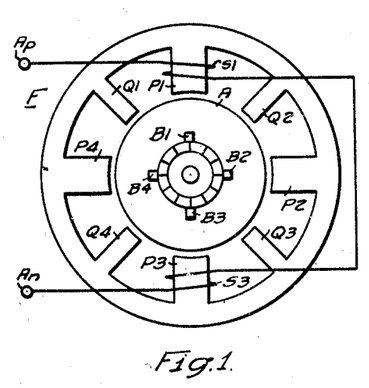
Figure 1 shows diagrammatically the field structure, commutator and the signal field windings of a four-pole machine according to the invention.

According to Figure 1, the field structure F of the machine is designed like that of a conventional four-pole generator. It has four main poles P1, P2, P3, P4 and four interpoles Q1, Q2, Q3, Q4. The armature A has a commutator with four brushes B1, B2, B3, B4. The armature conductors (not shown) are lap wound with conventional four-pole chording. As regards its circuit connections, of course, the machine differs fundamentally from those of normal generators. For the sake of explanation, however, the output (load) circuit and all internally excited machine circuits to be referred to below, are omitted in Fig. 1 which shows only the separately excited input circuit extending between the input terminals $A_p$ and $A_n$. This circuit includes two field windings S1 and S3 disposed on poles P1 and P3, respectively. Coils S1 and S3, hereinafter called "control coils," are so connected that the small signal voltage applied between the primary terminals $A_p$ and $A_n$ magnetize poles P1 and P3 in opposite directions to produce north polarity in one pole and south polarity in the other.

Figure 2:
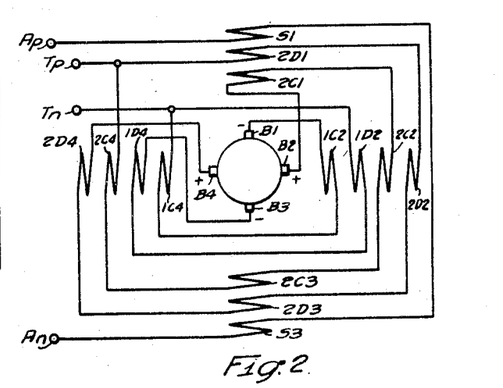
Fig. 2 is a schematic showing of the same machine and illustrates the control and forcing field windings under omission of the field-pole structure.
Figure 3:
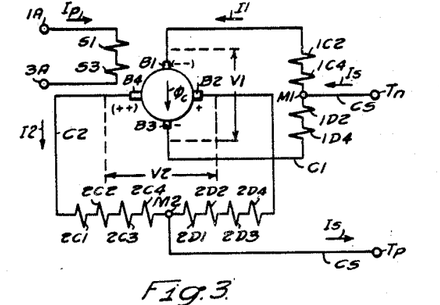
Figure 3 represents the same circuits as Fig. 2 in simplified straight-line fashion.

Fig. 2 shows the same machine more schematically as regards structural features but indicates all main field windings as well as their relative positions on the main pole axes P1—P3 and P2—P4. All field windings shown in Fig. 2 are also represented in Fig. 3 by a diagram which discards the showing of spacial relations between the field coils in favor of a simplified and clarified representation of the basic electric circuit connections of the machine. Both figures show the control coils S1 and S3 connected between input terminals Ap and An and located on poles P1 and P3, respectively, in accordance with Fig. 1.

When the control coils S1 and S3 are excited by signal voltage, with the armature of the machine running clockwise, the control flux ($\phi c$) caused by the signal excitation induces a voltage V1 (Fig. 3) between brushes B1 and B3. Assuming the control flux $\phi c$ so directed that it causes north polarity in pole P1 and south polarity in pole P3, brush B1 will be negative and brush B3 will be positive as regards the induced voltage. According to Figs. 2 and 3, brushes B1 and B3 are interconnected by a circuit C1 which includes four series-connected field windings (forcing coils) 1C2, 1C4, 1D2, 1D4, of which those denoted by 1C2 and 1D2 are located on pole P2 while windings 1C4 and 1D4 are associated with pole P4. The voltage V1 generated between brushes B1 and B3 drives an internal circulating current I1 (Fig. 3) through circuit C1. This current energizes coils 1C2 and 1D2 cumulatively so that pole P2 is excited by the sum of ampere turns of both coils. Similarly, pole P4 becomes cumulatively excited by coils 1C4, 1D4 and assumes a magnetic polarity opposite of that of pole P2 (Figs. 1, 2).

This excitation of poles P2, P4 induces in the armature another voltage (V2) between brushes B2 and B4. A circuit C2 extends between brushes B2 and B4, and includes eight series-connected field windings (forcing coils) 2C1, 2C2, 2C3, 2C4, 2D1, 2D2, 2D3, 2D4. Coils 2C1 and 2D1 are located on pole P1 and are cumulatively energized by the internal circulating current I2 driven through the circuit C2 by voltage V2 (Fig. 3). Similarly, coils 2C2 and 2D2 are disposed on pole P2, coils 2C3 and 2D3 on pole P3, and coils 2C4 and 2D4 on pole P4, each pair being cumulatively energized by current I2. As a result, all four main poles P1, P2, P3, P4 become excited by the voltage V2 between brushes B2 and B4. This excitation, taken by itself, is symmertical and balanced; that is, it tends to impart equal strengths to the four poles and causes opposite poles to assume opposite magnetic polarities thus making poles P1, P3 north poles and poles P2, P4 south poles.

The secondary or load terminals Tp and Tn of the machine (Figs. 2, 3) are connected to the mid-points M1 and M2 of circuits C1 and C2, respectively. Hence, terminal Tn is in connection with brushes B1 and B3, while terminal Tp is connected with brushes B2 and B4.

The above-described machine operates as a triple-stage amplifier so that the secondary or output voltage appearing across the load terminals Tp and Tn varies in dependence upon the changes of an input or signal voltage applied across terminals Ap and An. The three stages of amplification are more readily apparent from the equivalent substitute diagram of three cascade-connected machines shown in Fig. 4. In this explanatory diagram, three separate machines or armatures A1, A2, A3 are shown instead of the single armature actually used, and the above-described field windings, circuits and terminals are accordingly represented by the electric arrangements that they would have if three separate machines were used instead of the one according to the invention.

The first stage of amplification receives separate input excitation from terminals Ap and An and may be considered to represent a two-pole machine whose poles P1 and P3 (Fig. 1) are energized by the control coils S1 and S3. The amplified output voltage (V1) of this stage is generated in the armature windings between brushes B1 and B3.

The second amplifying stage may be considered to represent a second two-pole machine (poles P2 and P4) which receives input or field excitation from the brushes B1 and B3 of the first two-pole machine. This input excitation is applied by circuit C1 to the field coils (forcing coils) 2C2, 2C4, 2D2, 2D4 on the poles P2, P4 of the second two-pole machine. The amplified output voltage (V2) of the second stage appears between the brushes B2 and B4 of the second machine.

The third stage of amplification may be considered to involve a four-pole machine including all four poles and all four brushes of the generator. The input circuit C2 of this four-pole machine is excited by the output voltage (V2) between the brushes B2, B4 of the second two-pole machine, while the terminals Tn and Tp of the output circuit are attached to an equalizer connection C2 between brushes B2, B4 and another equalizer connection C1 between brushes B1 and B3.

Figure 4:
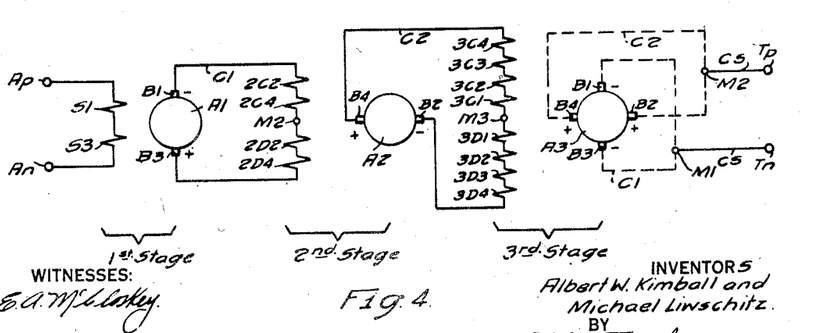
Fig. 4 is an explanatory and symbolic diagram representing the three amplifying stages involved in the machine according to the preceding figures.

While instead of three separate machines shown in the schematic diagram of Fig. 4, the three stages of amplifiers according to the invention are superimposed and merged into a single machine, the phenomena occurring in such an amplifier, as far as they are intended to be represented by Fig. 4, can, in fact, be considered separately, provided the magnetic structure of the machine operates within the unsaturated region of its magnetization curve. Then, the magnetic fluxes occurring in the above-assumed hypothetical three machines superimpose themselves upon one another substantially as if they occurred in separate magnetic devices. Hence, a rating of the magnetizable machine elements for operation below saturation is an essential requirement of the invention as regards all embodiments and modifications described in this specification. A machine thus designed is in fact equivalent to three cascade-connected machines as regards the presence of three amplifying stages. However, since in reality a machine according to the invention has only one frame and armature structure, it affords not only considerable saving in material and space but avoids also the magnetic sluggishness inherent in the performance of three cascade machines. In other words, an amplifier according to the invention has a much lower time constant, i. e., a highly increased speed of response of its amplified output voltage to changes in signal voltage than could possibly be obtained with three separate machines.

The performance of the above-described four-pole amplifier (Figs. 1 to 3), involving a superposition of three generators within a single machine, will be more fully understood from the detailed discussion of the magnetic and electric characteristics presented below with reference to the explanatory diagrams of Figs. 5 to 11. It should be noted that in these figures, the brushes B1, B2, B3, B4 are shown not in their actual positions but, for the purpose of explaining angular relations, are illustrated without a commutator as if they contacted directly the armature conductors at the proper points of commutation.

It will be noted, from a comparison of the three-machine scheme of Fig. 4 with the single machine of Figs. 1 to 3, that in a single machine according to the invention, the brushes appertaining to the last amplifying stage are identical with those appertaining to the preceding stages, and that the secondary or load circuit extends through the circuits (C2, C1) of the preceding stages. It has been explained above that, with magnetization below saturation, the three stages operate as if they were separate devices in magnetic respect. It remains to be discussed, however, why the community of brushes and circuits of the several stages does not interfere with the desired triple-stage amplification.

Figure 5:
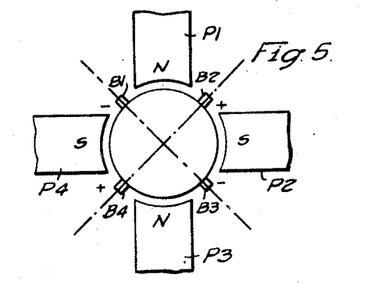
Figs. 5 through 12 are additional diagrams explanatory of the performance of the same machine.

Fig. 5 shows the main poles P1, P2, P3, P4 and brushes B1, B2, B3, B4 of the last amplifying stage representing a four-pole machine. Considering merely the four-pole excitation furnished by coils 3C1, 3C2, 3C3, 3C4, 3D1, 3D2, 3D3, 3D4 (Figs. 2, 3, 4) poles P1 and P3 are north poles and poles P2 and P4 are south poles and provide a magnetization of symmetrical flux distribution. For clockwise rotation, brushes B1 and B3 are negative, and brushes B2 and B4 are positive. With respect to this four-pole machine, the lap-wound armature windings are normal, that is, they have little or substantially no chording as in conventional four-pole generators. Hence, the angular position of the brush axes B1—B3 and B2—B4 at which the brushes pick up maximum voltage are substantially 45° displaced from the pole axes P1—P3 and P2—P4.

Figure 6:
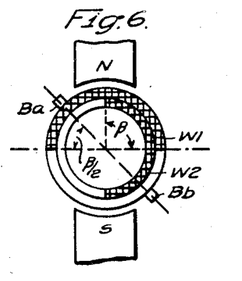
Figure 7:
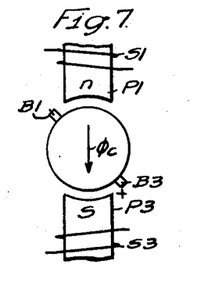

Referring now to the two two-pole machines superimposed on the four-pole machine and forming respectively the first and second stages of the cascade, the axes of the respective pairs of brushes would have to be 90° displaced from the pole axes if the armature windings had no appreciable chording. As regards these two-pole machines, however, the armature windings are not normal but have 50% (90°) chording. Fig. 6 shows schematically a two-pole machine with north (N) and south (S) poles, brushes Ba and Bb, and chorded armature windings, such as those represented by W1 and W2. It holds good, in general, that when the chording of the armature windings in a two-pole machine is equal to $\beta$, the position of the brush axis Ba—Bb, for maximum voltage between the brushes, is shifted by the angle $\beta/2$ opposite to the chording angle $\beta$, regardless of the polarity of the poles and the direction of armature rotation. Consequently, in the first two-pole stage of the machine, the maximum-voltage position of the appertaining brushes B1 and B3, as shown in Fig. 7, is 45° displaced from the pole axis P1—P3 and therefore coincides with the maximum-voltage position of these brushes in the four-pole stage (Fig. 5). Correspondingly, the position of brushes B2 and B4, appertaining to the second two-pole stage, when adjusted for maximum voltage is identical with the maximum voltage position of the same brushes relative to the four-pole stage.

While relative to the four-pole stage, poles P1 and P3 are both north poles and brushes B1 and B3 are both electrically negative, the magnetic and electric polarities are different for the same poles and brushes with respect to the first two-pole stage. Under the above-mentioned operating conditions and as shown in Fig. 7, pole P1 is a north pole ($n$) and pole P3 a south pole ($s$) in this two-pole stage, and the corresponding magnetic control flux $\phi c$ causes brush B1 to be negative and brush B3 to be positive. If it is kept in mind that the magnetic flux and electric voltage are strongest in the four-pole stage of the amplifying system, it will be recognized that the magnetic and electric conditions of the first two-pole stage, superimposed on the four-pole stage, have the effect of strengthening the north polarity in pole P1 of the four-pole machine ($N+n$) while weakening the north polarity of pole P3 ($N-s$), and that similarly the brush B1 of the four-pole stage becomes more strongly negative while the negative potential of brush B3 is reduced. Thus, the performance of the first two-pole stage has the effect of distorting the flux distribution of the normally symmetrically excited four-pole machine and imposes a controlled difference in potential on the interconnected equipolar (negative) brushes B1 and B3 of the four-pole machine. The current (I1, see Fig. 3) flowing between brushes B1 and B3 through the appertaining equalizing connection C1 may therefore be considered to be caused by the distortion or asymmetry of flux distribution imposed on the four-pole machine.

Figure 8:
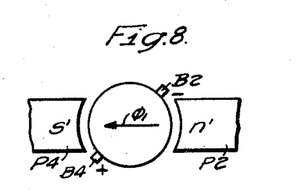

Similarly, the second two-pole stage, as represented in Fig. 8, has its north pole ($n'$) at pole P2 and its south pole ($s'$) at pole P4. Brush B2, relative to this two-pole stage, assumes negative polarity while brush B4 becomes positive. Superimposed on the predominant excitation of the four-pole stage, the resultant effects are a weakening of south pole P2 and strengthening of south pole P4 of the four-pole machine thus causing another distortion of the normally balanced four-pole flux. The equipolar brushes B2 and B4 of the four-pole machine, in further consequence, assume different potentials, brush B2 reducing and brush B4 increasing their respective positive values. Hence, the circulating current I2 (Fig. 3) may also be considered to be an equalizing current resulting between equipolar brushes of a four-pole machine due to a controlled distortion or unbalance of the four-pole flux distribution.

The flux $\phi c$ (Fig. 7) produced in the first two-pole stage by the signal voltage imposed on control coils S1 and S2, while controlling the voltage (V1) between brushes B1 and B3, does not induce any voltage between brushes B2 and B4; conversely, the current I1 (Fig. 3) which is the exciting current of the second stage generates the voltage V2 between brushes B2 and B4 under control by forcing coils 1C2, 1C4, 1D2, 1D4 and does not cause any voltage between brushes B1 and B4; nor has the output current of the four-pole stage, appearing between terminals Tp and Tn, an influence on the voltages V1 and V2 of the preceding two two-pole stages. This will be understood from the following considerations.

Figure 9:
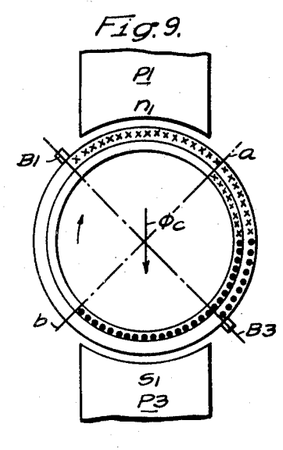
Figure 10:
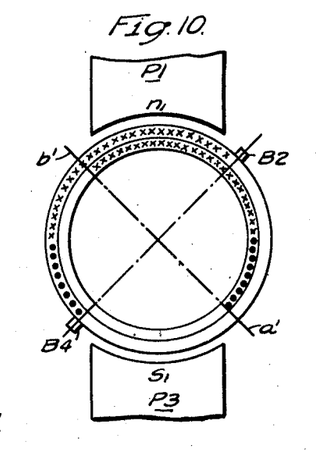
Figure 11:
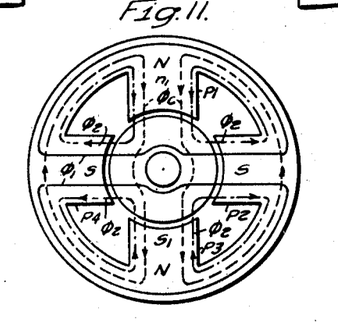

Fig. 9 elucidates the electromotoric forces induced by the control flux $\phi c$ in the first two-pole stage between the brushes B1 and B3, and Fig. 10 refers to the electromotoric forces caused by the same flux between the brushes B2 and B4. Only one of the two armature paths between each brush pair is considered in these figures. A number of conductors, arranged in outer and inner layers, are represented. Those denoted by a cross (×) are induced so as to pass current in a direction from the observer toward the plane of illustration, and those denoted by a dot (.) are induced to pass current in the direction from the plane of illustration toward the observer. When the armature rotates clockwise and the control coils are excited to induce control flux $\phi c$, the conductors of the two-pole armature which lie in the interpolar space between brush B3 and position $a$ (Fig. 9) contribute nothing to the voltage between B1 and B3 because their E. M. F.'s cancel each other. The resultant voltage between brushes B1 and B3 is composed of the E. M. F.'s in the outer conductors that lie between B1 and $a$, and those of the inner conductors which lie between B3 and $b$. The E. M. F.'s in the inner conductors have a direction opposite to that of the outer conductors so that the effective E. M. F.'s of both conductor layers are additive. Referring now to Fig. 10, it will be seen that relative to brushes B2 and B4, the conductors lying between B2—$a'$ and $b'$—B4 can be disregarded. In the remaining conductors between $b'$ and B2, the E. M. F.'s of the inner layer have the same direction as those of the outer layer so that they cancel each other. Hence no resultant voltage appears between brushes B2 and B4 as a result of flux $\phi c$. It should be noted that the flux $\phi c$, passing through the poles P1 and P3, does not traverse the poles P2 and P4, as is schematically indicated in the diagram of Fig. 11.

A similar consideration, applied to the second two-pole stage, shows that the amplified flux $\phi 1$ produced in poles P2 and P4 by the current I1 (Fig. 3) controls only the voltage V2 between brushes B2 and B4 but has, in fact, no effect on the voltage between brushes B1 and B3. The flux $\phi 1$ through poles P2 and P4 does not pass through the poles P1 and P3, as is also represented in Fig. 11.

The foregoing discussion based on Figs. 9 and 10 can be summarized by stating that only one of the two brush pairs B1, B3 or B2, B4 can possibly derive voltage from the appertaining two-pole machine, because, since that one pair is adjusted to the maximum voltage of the machine, the other pair must necessarily be adjusted to zero voltage as it is 90° displaced from the maximum voltage position.

When a load is connected to the secondary terminals T$p$ and T$n$, the load current I$s$ (Fig. 3), though flowing through the circuits C1 and C2, should not influence the above-mentioned voltage conditions of the two-pole stages. The design and arrangement of the forcing coils in pairs, such as the coil pair 1C2 and 1D2 on pole P2 or the pair 2C1 and 2D1 on pole 1, serves to obtain such load independence. The coils of each pair have equal turns and are so arranged in the respective circuits C1 and C2 that they lie on opposite sides of the mid-point M1 or M2. Therefore, the load current I$s$, flowing from terminal T$n$ to point M1 (Fig. 3) divides itself into two components which, in circuit C1, traverse the two parallel paths M1—1C4—1C2—B1 and M1—1D2—1D4—B3. The two load current components thus energize the coils 1C2 and 1D2 in opposite directions so that their resultant effect on pole P2 is zero. For the same reason, the coils 1C4 and 1D4 on pole P4 cancel each other as regards the magnetizing effect of the load current. In other words, while the coils of each pair act cumulatively on the appertaining pole as regards the effect of the internal circulating current I1, they are differentially connected and mutually balanced relative to the flow of load current.

The coils of pairs 2C1—2D1, 2C2—2D2, 2C3—2D3, and 2C4—2D4 in circuit C2 are also disposed in a balanced arrangement relative to the point M2. Hence the load current I$s$, flowing in two parallel brances from B2 to M2 and from B4 to M2 has again no effect on the magnetization of the four-pole stage of the machine.

The flow of current in the armature conductors of machines according to the invention has the effect of producing an armature reaction flux. As regards the armature reaction secondarily caused by the control field excitation (control coils S1 and S2) of the first two-pole stage and the armature reaction incident to the operation of the four-pole stage, the reaction effects are not different from those occurring in conventional generators. That is, these reaction phenomena can readily be compensated by a proper rating of the forcing coils whose efficacy the phenomena tend to reduce. The armature reaction due to the operation of forcing coils 1C2, 1D2 and 1C4 and 1D4 on poles P2 and P4 of the second amplifying stage, however, should be given special consideration in order to increase the efficiency and sensitivity of the machine beyond the performance values otherwise attainable. This will be understood from the following reference to Fig. 12.

Figure 12:
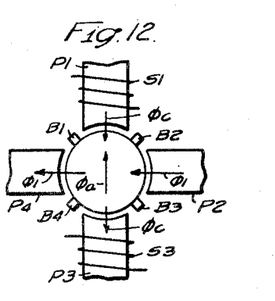

As shown schematically in Fig. 12, the exciting flux $\phi 1$ of the second two-pole stage, produced by the forcing coils on poles P2 and P4 and inducing voltage in the armature conductors between brushes B2 and B4, is also the cause of a secondary armature reaction flux $\phi a$ which extends at a right angle to the pole axis P2—P4. This reaction flux $\phi a$ is in opposition to the control flux $\phi c$ caused by the excitation of the control coils S1 and S2 of the first two-pole stage and hence tends to weaken the primary control flux. If no provision is made to reduce or eliminate this weakening effect, the machine will tend to operate under such conditions that the reaction flux $\phi a$ is smaller than the control flux $\phi c$ by just a sufficient amount to maintain a flow of circulating currents I1 and I2 (see Fig. 3); and this would result in a rather inefficient use of the control field energy and put a corresponding limit to the use of the machine for amplifying extremely minute signal voltages.

Figure 13:
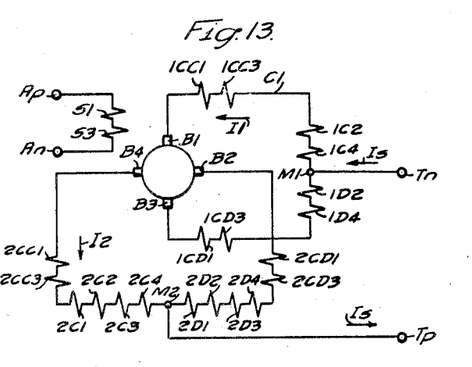
Fig. 13 is a circuit diagram, also appertaining to the machine shown in the preceding figures, and shows compensating field windings in addition to those aforementioned.

It is, therefore, preferable to provide the machine with compensating coils which balance the demagnetizing armature reaction flux $\phi a$ of the second two-pole stage as exactly as possible. Such windings may be either of distributed or concentrated type, although only the latter type, for convenience, is shown in the following illustrations. These compensating coils may be placed on the pole shoes of poles P1 and P3 and energized by the circulating current I1 or I2 or both of the internally excited two pole stages. Accordingly, Fig. 13 shows a circuit diagram, similar to that of Fig. 3, which includes compensating coils 1CC1, 1CD1 on pole P1, and coil 1CC3, 1CD3 on pole P3. These coils are connected in circuit C1 to be energized by the internal circulating current I1. Fig. 13 shows further a group of compensating coils 2CC1, 2CD1 and 2CC3, 2CD3 for poles P1 and P3 respectively which are connected in circuit C2 and energized by the circulating current I2. Either one or both of these groups may be employed, and in each case be given the number of turns required for the desired degree of compensation of flux $\phi a$ (Fig. 12). The two compensating coils on each pole, such as coils 1CC1 and 1CD1 on pole P1, are so connected that they act commutatively relative to the energizing circulating current but are differential and balanced with respect to the load current $Is$ of the four-pole stage. Consequently, the compensating effect is not influenced by the load current of the machine.

In order to secure proper commutation, machines according to the invention, like ordinary generators, are to be provided with commutation or interpole windings located on the interpoles Q1, Q2, Q3 and Q4 of the field structure shown in Fig. 1. In order to obtain optimum performance, however, design and connection of the commutating field windings are preferably different from conventional generators. While in ordinary generators, the current distribution within the armature conductors between the load brushes is normally balanced, these currents do not maintain a fixed ratio of distribution in machines according to the invention. The distribution is substantially balanced only when the signal excitation of the control coils (S1 and S3 in Figs. 1 to 3) is zero. With a finite excitation applied to the control coils, however, the circulating or unbalance currents $I1$ and $I2$ (see Fig. 3) will flow between brushes B1—B3 and B2—B4 respectively, and these unbalance currents vary in magnitude depending upon the degree of signal excitation. Hence, the commutating coils on interpoles Q1, Q2, Q3, Q4 should be designed to take care of proper commutation not only relative to the balanced current distribution of the four-pole stage but also with respect to the unbalance conditions caused by the presence of the circulating currents $I1$ and $I2$. The following consideration leads to a more accurate expression of the requirements to be met by the interpole coils and refers to machines whose detrimental armature reaction is compensated by concentrated coils (rather than by distributed windings in the pole shoes).

If $N$ represents the total number of turns of the armature, $Is$ the load current in the secondary circuit $Cs$, $I1$ the unbalance current in connection $C1$ between brushes B1 and B3, and $I2$ the unbalance current in connection $C2$ between brushes B2 and B4, the total effective turns ($N1$) of the commutation coils on the interpole axis Q1—Q3 required to commutate the currents $I1$ and $I2$ is:

$$N1 = \frac{N}{4}I1 + \frac{N}{4}I2 \quad (1)$$

and the number of effective turns ($N2$) on the axis Q2—Q4 for commutating the currents $I1$ and $I2$ is:

$$N2 = \frac{N}{4}I1 - \frac{N}{4}I2 \quad (2)$$

For the commutation of the load current $Is$ each interpole requires the number ($N3$) of turns:

$$N3 = \frac{N}{4} \times \frac{Is}{2} = \frac{N}{8} Is \quad (3)$$

because $$\frac{Is}{2}$$

is the component load current flowing in each of the two parallel paths formed by each of the connections C1 and C2.

Thus the interpole windings on axis Q1—Q3 must satisfy the Equation 1 for the unbalance currents and also the Equation 3 for the load current; while the windings on axis Q2—Q4 must be in accordance with Equation 2 for the unbalance currents and also with Equation 3 for the load current.

Figure 14:
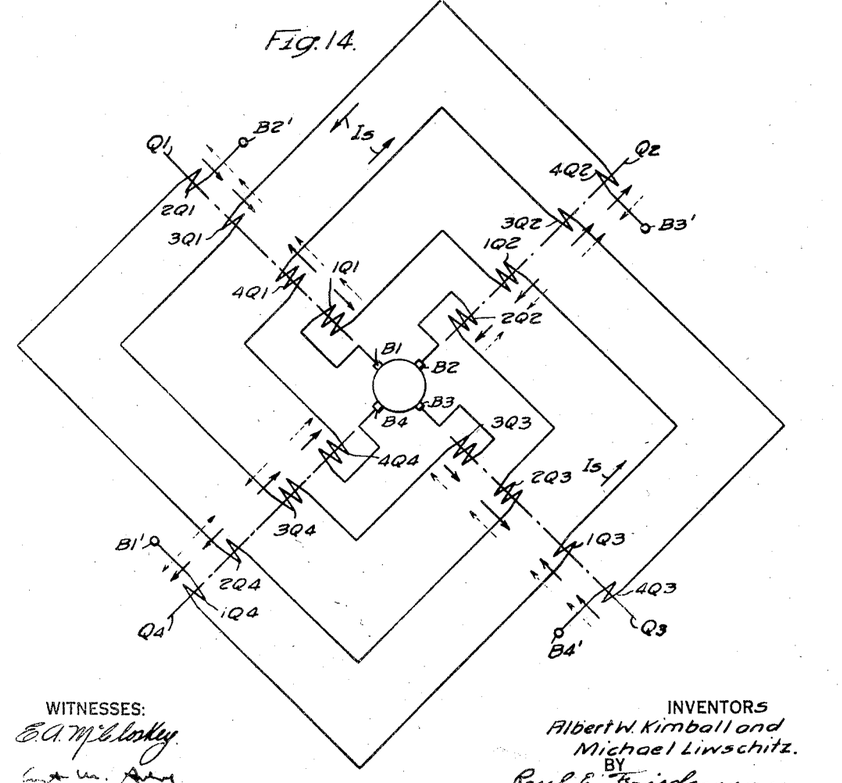
Fig. 14 shows the circuits of the commutation windings for the interpoles of four pole machines according to the invention.

An example of interpole coils satisfying these conditions for the approximation that the current value of $I1$ and $I2$ are equal, is illustrated in Fig. 14. The interpole Q1 (see Fig. 1) is provided with four commutation coils 1Q1, 2Q1, 3Q1, 4Q1; interpole Q2 has four commutation coils 1Q2, 2Q2, 3Q2, 4Q2; interpole Q3 has four coils 1Q3, 2Q3, 3Q3, 4Q3; and the four commutation coils 1Q4, 2Q4, 3Q4, 4Q4 are disposed on interpole Q4. The commutation coils whose designation includes the prefix 1 are series-connected between brush B1 and a point B1' in the circuit C1 between brushes B1 and B3, as is more clearly apparent from the complete circuit diagram shown in Fig. 15. The commutation coils prefixed by 3 lie also in series between brush B3 and point B3' in circuit C1. The commutation coils prefixed by 2 and 4 are series-connected between B2, B2' and B4, B4', respectively, in the circuit C2 between brushes B2 and B4.

As schematically shown in Fig. 14, two of the commutation coils on each interpole have more turns than the other two. The two coils of each interpole shown next to the armature have three times as many turns as the remaining coils. Under no-load condition, with the control fields effective to produce a flow of circulating currents $I1$ and $I2$ through the commutation coils, as represented in Fig. 14 by full-line arrows, the resultant effective number of turns ($N2$, see Equation 2) of all Q2 and Q4 coils is zero. The turns of the Q1 coil and Q3 coils, however, act cumulatively so that the resultant number ($N1$, see Equation 1) of effective turns in the Q1—Q3 axis is equal to the sum of the turns of all Q1 and Q3 windings. In the opposite extreme as represented by broken-line arrows, i. e., with zero control field and a finite load current, normal interpole strength and polarity is obtained because the two outer coils on each interpole act differentially with respect to the two inner coils thus producing the correct net turns ($N3$) needed in accordance with Equation 3 (for $I1=I2$). Under intermediate conditions, the two effects represented in Fig. 14 combine to produce the desired commutating fields.

The performance of interpole coils as described above can be further improved by giving the larger coils (1Q1, 4Q1, 2Q2, 1Q2, 3Q3, 2Q3, 4Q4, 3Q4) somewhat more than three times the turns of the other interpole coils so that the additional turns will take care of the electromotive forces of self-inductance in the armature windings that are short-circuited by the commutator brushes.

Machines according to the invention, as described so far, operate exclusively as an amplifying device; that is, the occurrence and value of the output voltage depends only on the presence and value of the signal voltage. However, it is also possible to design such a machine for operating it as a normal generator when the excitation of the control field is zero, and as an amplifier superimposed on a normal generator when the control field is energized. The machine will then provide a given finite output voltage at zero control excitation and will vary or regulate this output voltage when a control excitation is applied. The above-exemplified four-pole machine, for instance, can be operated as a normal series generator if, in departure from the foregoing description of a purely amplifying device, the two coils appertaining to each pair of forcing coils of the four-pole stage are given unequal numbers of turns so that their differential excitation due to the load current Is is not balanced. For instance, the coils 2C1, 2C2, 2C3 and 2C4 (see Fig. 3 or 15) may be given more turns than the coils 2D1, 2D2, 2D3 and 2D4. A differential excitation of finite and variable magnitude is then effective in the four-pole machine wherein a load is applied to the output terminals Tp and Tn. This excitation is equivalent to a series-excitation and dependent upon the magnitude of the load current. Instead of such a design, or together therewith, a series coil may be placed on each of the four poles of the machine and connected in the secondary circuit of the machine such as the field coils F1, F2, F3, F4 shown in Fig. 15. Shunt field windings, as denoted in Fig. 15 by G1, G2, G3, G4 on poles P1, P2, P3, P4 respectively may also be used. As a matter of fact, the use of weak shunt fields connected across the load terminals may be useful for machines, amplifiers or other generators, in order to afford a finer adjustment, i. e., for securing an operation of the machine on the straight portion of its magnetic characteristic.

Figure 15:
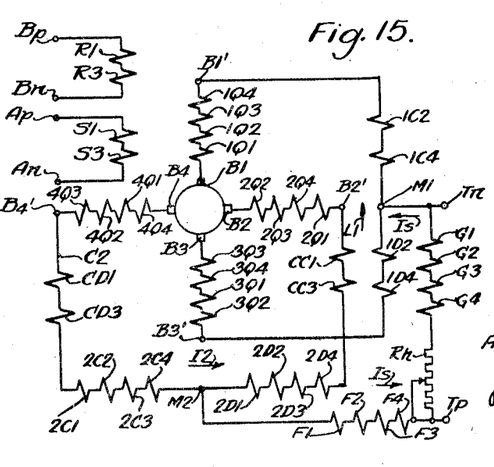
Fig. 15 is the complete circuit diagram of a three-stage four-pole amplifying machine embodying the details shown in the preceding figures.

Secondarily excited series and shunt field windings, arranged as shown in Fig. 15, may also be used to obtain tuned feedback excitation. To this end, the resistance of the secondary circuit including the coils is so adjusted, by a proper rating of the coils and, if desired, by means of a calibrating rheostat such as the one denoted by Rh in Fig. 15, that the resistance line coincides approximately with the no-lead characteristic of the machine. Thus "tuned," the fields of these load-circuit-excited coils provide substantially all excitation needed to maintain the output voltage of the machine at any value along the straight portion of the characteristic, so that the signal and forcing fields serve merely to shift this voltage along the characteristic to any point or value dictated by the signal excitation.

The circuit diagram of Fig. 15 illustrates also a modification of the signal-responsive input stage of the machine. While according to Figs. 1 to 3, and 13, a single primary circuit is used to provide control excitation for the input stage, Fig. 15 shows a circuit with terminals Bp, Bn and coils R1, R3 in addition to the signal circuit Ap—S1—S3—An. Coil R1 is located on pole P1 and opposes coil S1. Coil R3 is located on pole P3 to oppose coil S3. When the generator is in operation, a pattern voltage of selected magnitude is applied to terminals Bp and Bn, and the voltage (pilot voltage) to be responded to is applied to terminals An and Ap. When the pilot voltage equals the predetermined value of the pattern voltage, the fields of coils S1 and R1 on pole P1 balance each other, and the fields S2 and R2 on pole P3 are also in balance so that the resultant control field is zero. When the pilot voltage departs from the pattern value, a resultant differential control field is produced in accordance with the magnitude of the departure.

In all other respects, the machine represented in Fig. 15 involves the features discussed previously in conjunction with Figs. 1 through 14 as will be recognized from the use of corresponding reference characters. Thus, coils 1C2, 1C4, 1D2, 1D4 are the forcing coils of the second two-pole stage energized by the circulating current flowing between brushes B1 and B3 in circuit C1; and coils 2C1, 2C2, 2C3, 2C4, 2D1, 2D2, 2D3, 2D4 are the forcing coils of the four-pole stage energized in circuit C2 by the circulating current between brushes B2 and B4. The coils whose reference characters contain the letter Q are interpole windings and designed as explained above in conjunction with Figs. 14 and 15.

Figure 16:
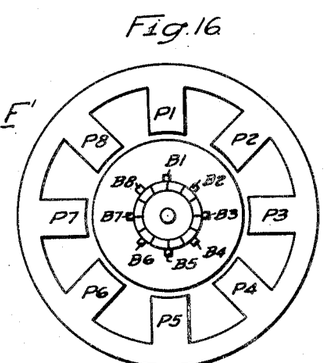
Figure 17:
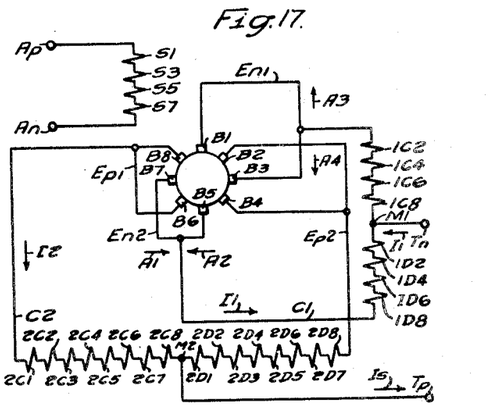
Figs. 17 and 18 represent the circuit diagrams of two respective embodiments containing such an eight-pole structure.
Figure 18:
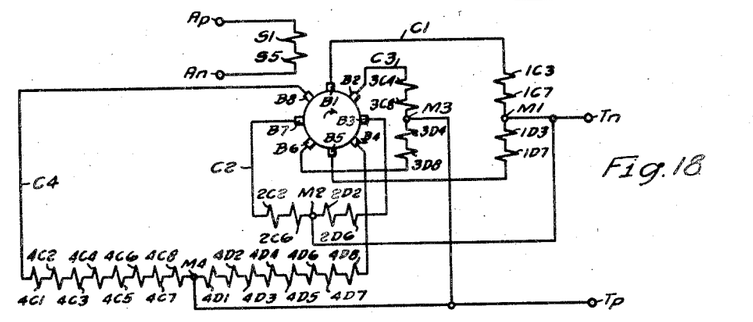

Figs. 16 to 18 illustrate the application of the invention to eight-pole machines. The magnetic frame or stator structure F' of such machines, as diagrammatically shown in Fig. 16, is similar to that of conventional eight-pole generators. The appertaining poles are denoted by P1 through P8. The armature conductors (not shown) have normal, i. e., little or substantially no chording relative to the eight-pole structure. The commutator has eight brushes, denoted by B1 through B8, which are positioned substantially as normal for ordinary eight-pole generators.

One of the possible circuit diagrams for an eight-pole machine according to the invention is shown in Fig. 17. Four control coils S1, S3, S5, S7 are series-connected between input terminals Ap and An and are disposed on poles P1, P2, P3, P7 respectively. When the armature runs clockwise, pole P1 being a north pole, P2 a south pole, P3 a north pole and so forth (relative to the eight-pole output stage), the brushes B1, B3, B5, B7 have negative potentials of the same magnitude, and brushes B2, B4, B6, B8 have positive potentials of the same magnitude as long as no signal voltage is applied. The occurrence of a signal voltage across terminals Ap and An causes coils S1 and S3 to strengthen equally the respective south poles P1 and P3, while coils S5 and S7 weaken the south poles P5 and P7 in equal amounts. As a result, brushes B1 and B3 increase this negative potential and brushes B5 and B7 decrease their negative potential. That is, the potentials of equipolar brushes B1 and B3 remain substantially equal to each other, and the potential of equipolar brushes B5 and B7 remain also equal to each other. Hence, no equalizing current flows in connection En1 between brushes B1 and B3, and in connection En2 between brushes B5 and B7. The circuit C1 extending between the connections En1 and En2 is traversed by an internal circulating current I1 flowing from both brushes B5 and B7 to both brushes B1 and B3. This current I1 energizes eight forcing coils 1C2, 1C4, 1C6, 1C8, 1D2, 1D4, 1D6, 1D8 which are located on poles P2, P4, P6 and P8 so that coils 1C2 and 1D2, 1C4 and 1D4, 1C6 and 1D6, 1C8 and 1D8 act cumulatively relative to current I1. The excitation of poles P2, P4, P6 and P8, controlled by the forcing coils of circuit C1, causes brushes B6 and B8 to equally increase, and brushes B2 and B4 to equally decrease their respective positive potentials. Equipotential brushes B6 and B8 are interconnected by an equalizing conductor Ep1, and another equalizing conductor Ep2 is connected between brushes B2 and B4. The circuit C2, attached across the connections Ep1 and Ep2, is traversed by an internal circulating current I2 which flows from brushes B6 and B8 to brushes B2 and B4. Eight forcing coils denoted as a whole by "2C1 to 2C8" and eight forcing coils denoted by "2D1 to 2D8" are all series connected in circuit C2 and disposed in pairs on all eight poles. The output terminals Tp and Tn of the machine are connected to midpoints M2 and M1 of circuits C2 and C1 respectively. The arrangement and rating of the "C" coils and "D" coils is such that the load current Is has no magnetizing effect on the poles (unless a series excitation is desired) as explained above with reference to the four-pole machine.

The eight-pole generator just described represents a three-stage amplifier, the three stages having a pole ratio of 4:4:8. The first stage is separately excited by control coils S1, S3, S5, S7 on the four poles P1, P3, P5, P7 and provides an amplified voltage between brushes B1, B3 and B5, B7. The second stage has also four poles. Its input circuit C1 includes the forcing coils 1C2, 1C4, 1C6, 1C8, 1D2, 1D4, 1D6, 1D8 on poles P2, P4, P6, P8; and its output voltage appears at brushes B2, B4, B6, B8 across circuit C2. The last stage includes all eight poles with a total of sixteen forcing coils marked "2C1 to 2C8," and "2D1 to 2D8." The output circuit between secondary terminals Tp and Tn, involves all eight brushes of the machine.

It will be recognized that this amplifier may be looked upon as being substantially a duplication, within a single eight-pole machine, of the four-pole three-stage amplifier described previously. It is an outstanding feature of the invention, however, that it permits increasing the number of amplifying stages for any selected total pole number up to the mathematically possible maximum if desired. Thus, for instance, an eight-pole machine, having a stator and armature structure as shown in Fig. 16, may be given any number of amplifying stages up to the maximum of seven cascades. The invention makes it further possible to provide plural-stage amplifiers in which the pole ratio between one stage, preferably the last one, and the preceding stage is larger than 2:1. This will be understood from the basic circuits of the four-stage amplifier described below with reference to Fig. 18.

The eight-pole machine schematically represented by Fig. 18 has four amplifying stages of a pole ratio 2:2:2:4. The signal voltage is applied to input terminals Ap and An and energizes control coils S1 and S5 on the first and fifth poles (north poles) causing a difference in potential to appear between (negative) brushes B1 and B5, thus driving a circulating current through the input circuit C1 of the second stage. The second two-pole stage is excited by forcing coils 1C3, 1D3 on the third pole and forcing coils 1C7, 1D7 on the seventh pole. The output voltage of this second stage appears across brushes B3 and B7 and drives a circulating current through the input circuit C2 of the third two-pole stage. Circuit C2 includes forcing coils 2C2 and 2D2 on the second pole and forcing coils 2C6, 2D6 on the sixth pole and induces a voltage across brushes B2 and B6. The latter voltage excites the input circuit C3 of the fourth two-pole stage with forcing coils 3C4 and 3D4 on the fourth pole and forcing coils 3C8 and 3D8 on the eighth pole. The output voltage of the third stage appears across brushes B4 and B8 and excites the input circuit C4 of the last stage which has forcing coils 4C1 to 4C8 and 4D1 to 4D8. The output circuit of the last (eight pole) stage extends from secondary terminal Tn to mid-points M1 and M2 and thence to all negative brushes B1, B5, B3, B7, while secondary terminal Tp is connected through mid-points M3 and M4 to all positive brushes B2, B6, B4, B8.

In all embodiments of the invention described so far, the useful field excitation for energizing all amplifying stages of the respective machines is induced by field coils. It should be understood, however, that the invention permits also the application of armature reaction flux for providing the exciting field for one or several stages of the amplifying machine system. This is explained below with reference to the examples of an armature-reaction excited four-pole machine (Figs. 19, 20) and an armature-reaction excited eight-pole machine, Fig. 21).

Figure 19:
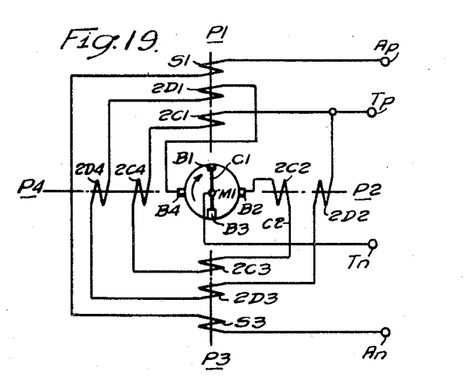
Figs. 19 and 20 are circuit diagrams of four-pole three-stage machines according to the invention in which one of the amplifying stages is excited by armature reaction.

The four-pole generator shown in, Fig. 19 in analogy to the completely coil-excited machine represented by Figs. 2 and 3, has a normal magnetic stator structure and a four-pole armature with four brushes as shown in Fig. 1. The externally excited input circuit of the first amplifying stage has two control coils S1 and S3 disposed on poles P1 and P3 and connected to input terminals Ap and An, also as shown in Fig. 1. In contrast to the machine according to Figs. 2 and 3, however, the internal circuit C1 in the generator of Fig. 19 contains no forcing coils and consists of a short-circuit between brushes B1 and B3. Hence, the voltage difference caused between brushes B1 and B3, due to the control field $\phi c$ of coils S1 and S3, drives a rather heavy current I1 through the connection C1 and through the armature windings short-circuited thereby. The armature windings produce an armature reaction flux which extends at a right angle to the control flux and passes through poles P2 and P4 thereby exciting these poles. As a result, a voltage difference is produced between equipolar brushes B2 and B4, and this voltage difference is applied, in circuit C2, to pairs of forcing coils 2C1 and 2D1, 2C2 and 2D2, 2C3 and 2D3, 2C4 and 2D4 disposed on all four poles respectively. The secondary terminals Tn and Tp are attached to the short-circuit connection C1 and to the midpoint M1 of coil circuit C2 respectively. It will be recognized that this machine is a three-stage amplifier with a pole ratio of 2:2:4 whose input circuit is externally excited by signal voltage while the remaining two stages are excited by internal circulating currents. Aside from the utilization of armature reaction for exciting the second two-pole stage, the performance of the machine is similar to that of the coil-excited machine first described.

Figure 20:
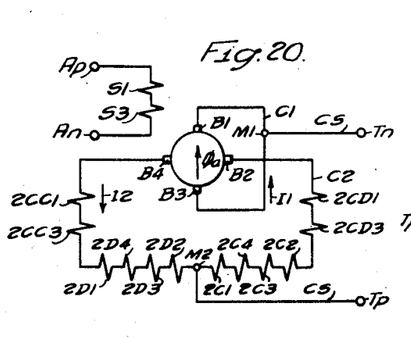

In machines according to Fig. 19, the current I2 flowing between brushes B2 and B4 induces an armature reaction flux in opposition to the control flux $\phi c$ of poles P1 and P3. For optimum results, therefore, this demagnetizing reaction flux must be reduced or compensated by compensating coils substantially in the manner already described. Fig. 20, for instance, shows the circuit diagram of a machine, otherwise similar to that of Fig. 19, which has pairs of compensating coils 2CC1, 2CD1 on pole P1 and 2CC3, 2CD4 on pole P3. These coils are traversed by the current I2 which causes the demagnetizing flux and are so connected as to reduce the flux. The coils of each pair act cumulatively relative to current I2 but are differential and balanced with respect to the load current. Interpole windings may be provided in accordance with Fig. 14, and all other modifications described above may likewise be applied to machines of the armature-reaction excited type.

Figure 21:
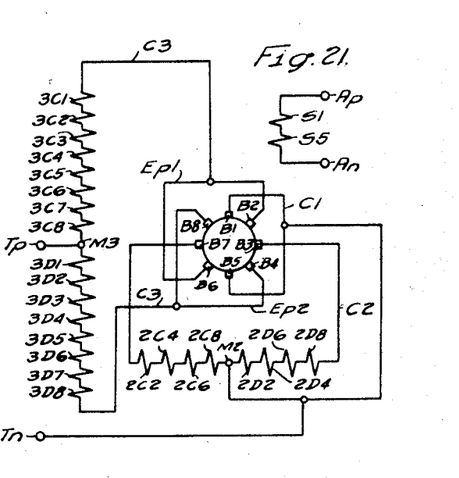
Fig. 21 shows the circuit diagram of an eight-pole machine also embodying the use of armature reaction for the excitation of internal amplifying stages.

The eight-pole generator represented, in principle, by the circuit diagram of Fig. 21 has four amplifying stages of a pole ratio 2:2:4:8 and is equipped with a frame and armature structure of the type shown in Fig. 16. The control coils S1 and S5, connected to primary terminals Ap and An, are disposed on poles P1 and P5 and induce a voltage difference between negative brushes B1 and B5 which are short-circuited by circuit C1. The short-circuit current circulating through the armature windings produces an armature reaction flux in the pole axis P3—P7 so that a corresponding voltage difference is produced between negative brushes B3 and B7, which, in circuit C2, excites pairs of forcing coils 2C2, 2D2 and 2C4, 2D4 and 2C6, 2D6 and 2C8, 2D8 on poles P2, P4, P6, P8 respectively. Positive brushes B2 and B6 are interconnected by an equalizing connection Ep1, and positive brushes B4, B8 are interconnected by a connection Ep2. The voltage difference between connections Ep1 and Ep2 is applied by circuit C3 to eight forcing coils denoted by "3C1 to 3C8" and eight forcing coils denoted by "3D1 to 3D8." These coils are arranged in pairs on all eight poles and provide excitation for the last amplifying stage. The secondary terminal Tp is attached to the mid-point M3 of circuit C3 and thus in connection with all positive brushes B2, B6, B4, B8. The secondary terminal Tn is attached to connection C1 and to the mid-point M2 of circuit C2 and thus connected to all negative brushes B1, B5, B3, B7. Interpole windings and coils for compensating demagnetizing armature reaction in the several circuits may be provided in accordance with the above-explained principles but are not shown in the basic diagram of Fig. 21.

It will be obvious from the various modifications referred to in the foregoing that as regards the total number of machine poles, the number, circuit arrangement and pole ratio of the plurality of amplifying stages incorporated in the machine as well as regards such auxiliary means as compensating windings and interpole windings, the invention permits of many variations and changes without departing from its principles and within the scope of its essential features as set forth in the claims attached hereto.

We claim as our invention:

1. A rotary direct-current generator, comprising a field structure with a plurality of poles; an armature having a commutator with a plurality of brushes; a primary circuit having control field windings disposed on a first group of said poles for inducing a voltage difference between a first group of said brushes; and a plurality of internally excited amplifying stages arranged in cascade relative to one another and including a first stage having an input circuit connected to said first group of brushes for exciting a second group of said poles so as to induce a voltage difference between a second group of said brushes, and a second stage having an input circuit connected to said second group of brushes for exciting a third group of said poles to produce a voltage difference between a third group of brushes; and a secondary circuit for providing load current under control by said latter voltage difference.

2. A rotary direct-current generator, comprising a field structure with a plurality of poles; an armature having a commutator with a plurality of brushes; a primary circuit having control field windings disposed on a first group of said poles for inducing a voltage difference between a first group of said brushes; and a plurality of internally excited amplifying stages arranged in cascade relative to one another and including a first stage having an input circuit connected to said first group of brushes for exciting a second group of said poles so as to induce a voltage difference between a second group of said brushes, and a second stage having an input circuit connected to said second group of brushes for exciting a third group of said poles to produce a voltage difference between a third group of brushes; and a secondary circuit for providing load current under control by said latter voltage difference, said third group of poles being larger in number than one of said other group of poles and including said one other group of poles, and said third group of brushes being larger in number than the corresponding other group of brushes and including the latter; and a secondary circuit for providing load current under control by said latter voltage difference.

3. A rotary direct-current generator, comprising a field structure with a plurality of poles; an armature having a commutator with a plurality of brushes; a primary circuit having control field windings disposed on a first group of said poles for inducing a voltage difference between a first group of said brushes; and a plurality of internally excited amplifying stages arranged in cascade relative to one another and including a first stage having an input circuit connected to said first group of brushes for exciting a second group of said poles so as to induce a voltage difference between a second group of said brushes, and a second stage having an input circuit connected to said second group of brushes for exciting a third group of said poles to produce a voltage difference between a third group of brushes; and a secondary circuit for providing load current under control by said latter voltage difference, said internally excited amplifying stages including a stage whose pole ratio relative to the preceding stage is at least two to one; and a secondary circuit for providing load current under control by said latter voltage difference.

4. A rotary direct-current generator, comprising a multi-pole field structure having multi-pole field windings for providing a magnetic flux component of balanced distribution, an armature having a commutator with a plurality of brushes disposed to assume positive and negative electric polarities respectively, controllable input means inductively coupled with said field structure for providing a first unbalanced flux component, field exciting means connected to an equipolar group of said brushes so as to excite in said structure an amplified other unbalanced flux component due to circulating current caused by said first unbalanced flux component, said multi-pole field windings being connected to another group of equipolar brushes so as to be controlled in dependence upon amplified circulating current caused by said amplified unbalanced flux component, and circuit means inductively associated with said group of brushes to be impressed by voltage generated in said armature under control by said flux component of balanced distribution.

5. A rotary direct-connected generator, comprising a field structure with a plurality of field poles, an armature having a commutator with a plurality of brushes, circuit connections disposed between respective groups of said brushes to provide a plurality of paths for circulating armature currents, field control means for exciting a group of said poles to produce a circulating current in one of said circuit connections, said one circuit connection being disposed for exciting another group of said poles in order to cause an amplified circulating current to flow in another one of said connections, two field windings disposed on each of said field poles for excitation under control by said amplified circulating current, said field windings on said plurality of poles being series connected with one another so that said excitation is cumulative for the two field windings on each of said plurality of poles, and circuit means conductively associated with said plurality of brushes through said connections to be impressed by voltage generated in said armature under control by said field windings, said circuit means being attached to said series connected field windings at a point between the two field windings of each of said poles so that said two field windings act differentially relative to each other as regards the flow of current through said circuit means.

6. A rotary direct-connected generator, comprising a field structure with a plurality of field poles, an armature having a commutator with a plurality of brushes, circuit connections disposed between respective groups of said brushes to provide a plurality of paths for circulating armature current, field control means for exciting a group of said poles to produce circulating current in one of said circuit connections, said one circuit connection being disposed for exciting another group of said poles in order to cause an amplified circulating current to flow in another one of said connections, a plurality of field windings disposed on said plurality of poles respectively and controlled in dependence upon said amplified circulating current, and circuit means conductively associated with said plurality of brushes through said connections so as to be impressed by voltage generated in said armature under control by said field windings, at least one of said plurality of connections forming a short circuit between the appertaining group of brushes in order to excite the appertaining group of poles by armature-reaction flux, a plurality of field windings disposed on said plurality of poles respectively and controlled in dependence upon said amplified circulating current.

7. A rotary direct-connected generator, comprising a field structure with a plurality of field poles, an armature having a commutator with a plurality of brushes, circuit connections disposed between respective groups of said brushes to provide a plurality of paths for circulating armature current, field control means for exciting a group of said poles to produce circulating current in one of said circuit connections, said one circuit connection being disposed for exciting another group of said poles in order to cause an amplified circulating current to flow in another one of said connections, at least one of said plurality of connections comprising field coils inductively associated with the appertaining group of poles and having two coils disposed on each pole to be excited by the circulating current of said latter connection, said two coils being series connected with each other and arranged to act cumulatively relative to said latter circulating current, two field windings disposed on each of said plurality of field poles for excitation under control by said amplified circulating current, said field windings on said plurality of poles being series connected with one another so that said excitation is cumulative for the two field windings on each of said plurality of poles, and two circuit leads conductively associated with said plurality of brushes through said connections in order to be impressed by voltage generated in said armature under control by said field windings, the conductive path between said leads and said brushes extending through a point between said two coils and through a point between said two field windings so that said coils and said windings are differentially arranged respectively relative to the flow of current through said path.

8. A rotary direct-connected generator, comprising a field structure with a plurality of field poles, an armature having a commutator with a plurality of brushes, circuit connections disposed between respective groups of said brushes to provide a plurality of paths for circulating armature current, field control means for exciting a group of said poles to produce circulating current in one of said circuit connections, said one circuit connection being disposed for exciting another group of said poles in order to cause an amplified circulating current to flow in another one of said connections, said one circuit connection being disposed for exciting another group of said poles in order to cause an amplified circulating current to flow in another one of said connections, at least one of said plurality of connections comprising auxiliary coils to be excited by the appertaining circulating current and inductively associated with said field structure for counteracting the effect of armature reaction on said field control means, a plurality of field windings disposed on said plurality of poles respectively and controlled in dependence upon said amplified circulating current, and circuit means conductively associated with said plurality of brushes through said connections so as to be impressed by voltage generated in said armature under control by said field windings.

9. A rotary direct-connected generator, comprising a field structure with a plurality of field poles, an armature having a commutator with a plurality of brushes, circuit connections disposed between respective groups of said brushes to provide a plurality of paths for circulating armature current, field control means for exciting a group of said poles to produce circulating current in one of said circuit connections, said one circuit connection being disposed for exciting another group of said poles in order to cause an amplified circulating current to flow in another one of said connections, at least one of said plurality of connections comprising two auxiliary coils inductively associated with said field structure for counteracting the effect of armature reaction on said field control means and connected in series with each other to be cumulatively excited by the circulating current of said latter connection, and two circuit leads conductively associated with said plurality of brushes through said connections in order to be impressed by voltage generated in said armature under control by said field windings, the conductive path between said leads and said brushes extending through a point between said two auxiliary coils so that said coils act differentially relative to current traversing said path.

10. A rotary direct-connected generator, comprising a field structure with a plurality of field poles, an armature having a commutator with a plurality of brushes, circuit connections disposed between respective groups of said brushes to provide a plurality of paths for circulating armature current, field control means for exciting a group of said poles to produce circulating current in one of said circuit connections, said one circuit connection being disposed for exciting another group of said poles in order to cause an amplified circulating current to flow in another one of said connections, at least one of said plurality of connections comprising field coils inductively associated with the appertaining group of poles, and auxiliary coils disposed in one of said connections and inductively associated with said structure for counteracting the opposing effect of armature reaction on the control function of said field coils, a plurality of field windings disposed on said plurality of poles respectively and controlled in dependence upon said amplified circulating current, and circuit means inductively associated with said plurality of brushes through said connections so as to be impressed by voltage generated in said armature under control by said field windings.

11. A rotary direct-connected generator, comprising a field structure with a plurality of field poles and a corresponding plurality of inter poles, an armature having a commutator with a corresponding plurality of brushes, circuit connections disposed between respective groups of said brushes to provide a plurality of paths for circulating armature currents, field control means for exciting a group of said poles to produce circulating current in one of said circuit connections, said one circuit connection being disposed for exciting another group of said poles in order to cause an amplified circulating current to flow in another one of said connections, a plurality of field windings disposed on said plurality of poles respectively and controlled in dependence upon said amplified circulating current, two circuit leads conductively associated with said plurality of brushes through said connections to be impressed by voltage generated in said armature under control by said field windings, and commutation windings arranged on said inter poles and disposed in said connections so that said inter poles receive component excitation due to said circulating currents and component excitation due to current flowing in said leads in order to vary the distribution of the resultant commutation field in accordance with changes in operating conditions of the generator.

12. A rotary direct current generator, comprising a field structure with four field poles for developing sequentially arranged north and south polarities, an armature of substantially 90 degree chording having a commutator with four brushes arranged to assume sequentially positive and negative electric polarities, control field windings disposed on said structure for varying the relative strength of two equipolar poles in order to produce a corresponding difference in potential between two equipolar brushes, circuit means connected between said two brushes and disposed for varying the relative field strength of said other two poles due to circulating current caused by said potential difference, two field windings disposed on each of said four poles and connected in series between said two other brushes to be cumulatively excited by circulating current due to said strength variation of said other two poles, and two circuit leads attached to said connection and to a point between said two field windings.

13. A rotary direct current generator, comprising a field structure with four field poles for developing sequentially arranged north and south polarities, an armature of substantially 90 degree chording having a commutator with four brushes arranged to assume sequentially positive and negative electric polarities, control field windings disposed on said structure for varying the relative strength of two equipolar poles in order to produce a corresponding difference in potential between two equipolar brushes, a short-circuit connection disposed between said two brushes for exciting said two other poles by armature reaction, two field windings disposed on each of said four poles and connected in series between said two other brushes to be cumulatively excited by circulating current due to armature-reaction excitation, and two circuit leads attached to said connection and to a point between said two field windings.

14. A rotary direct current generator, comprising a field structure with four field poles for developing sequentially arranged north and south polarities, an armature of substantially 90 degrees chording having a commutator with four brushes arranged to assume sequentially positive and negative electric polarities, control field windings disposed on said structure for varying the relative strength of two equipolar poles in order to produce a corresponding difference in potential between two equipolar brushes, four exciting coils series connected between said two brushes, two of said coils being arranged on each of said other two poles so as to be cumulatively excited by circulating current caused by said difference in potential, eight field windings series connected between said two other brushes, two of said field windings being arranged on each of said four poles so as to be cumulatively excited by circulating current due to the excitation of said two other poles, and two load circuit leads attached to the midpoint of said four coils and the midpoint of said eight windings respectively so that said coils and said windings, relative to said individual poles, are differentially connected with respect to the flow of current in said leads.

15. A rotary direct current generator, comprising a field structure with four field poles for developing sequentially arranged north and south polarities, an armature of substantially 90 degrees chording having a commutator with four brushes arranged to assume sequentially positive and negative electric polarities, control field windings disposed on said structure for varying the relative strength of two equipolar poles in order to produce a corresponding difference in potential between two equipolar brushes, a circuit connection attached to said two brushes and disposed for exciting said other two poles due to circulating current caused by said potential difference, another circuit connection extending between said two other brushes and containing eight series connected field windings of which two are arranged on each of said four poles respectively to be cumulatively excited by circulating current due to the excitation of said two other poles, a load circuit attached to said two connections so that said two windings of each pole are differentially arranged relative to said load circuit, and at least one pair of balanced compensating coils arranged on said structure for counteracting the effect of armature reaction on said control field windings and disposed in one of said connections so as to be cumulatively excited by circulating current flowing in said connection while cancelling the exciting effect of current traversing said load circuit.

MICHAEL LIWSCHITZ.
ALBERT W. KIMBALL.

REFERENCES CITED

The following references are of record in the file of this patent:

UNITED STATES PATENTS

| Number | Name | Date |
|---|---|---|
| 954,468 | Rosenberg | Apr. 12, 1910 |